United States Patent Office 2,730,105
Patented Jan. 10, 1956

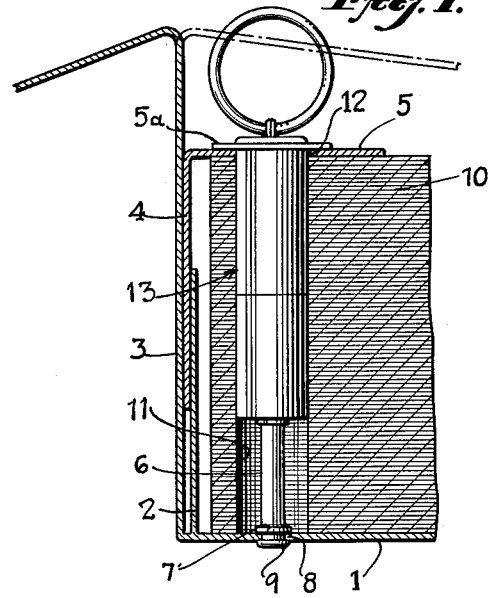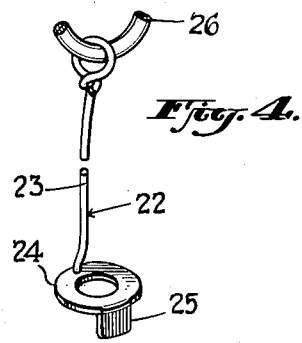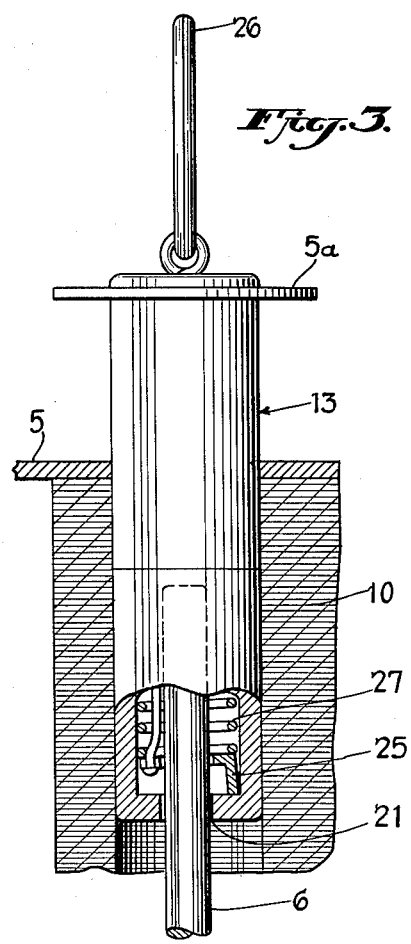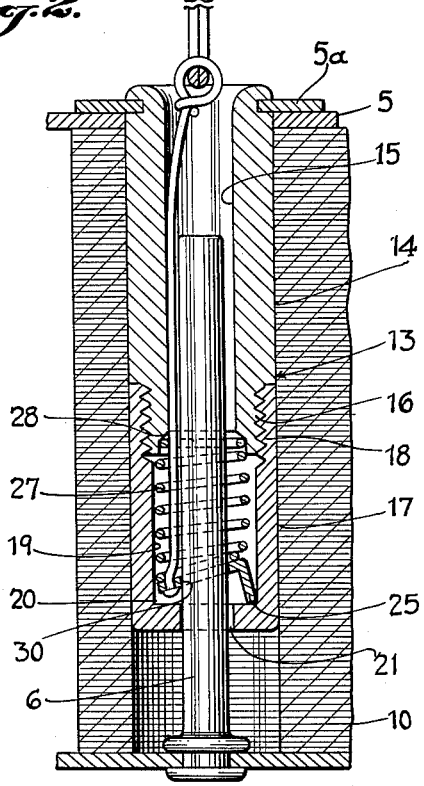

2,730,105

RING FASTENER ASSEMBLIES

Andrew E. Pisciotto, Jr., and Salvatore L. Pisciotto, Lakeview, N. Y.

Application July 24, 1953, Serial No. 370,164

2 Claims. (Cl. 129—8)

This invention relates to a novel and improved ring fastener assembly for use in loose-lease binders.

Ring fastener assemblies of this same general class are now being marketed. In general, they comprise an internally tapered sleeve carried by the upper part of the binder, a tubular operating member slidable in the sleeve and having a hollow lower portion adapted to receive an upstanding pin secured to the lower portion of the binder. Ball bearings carried by the operating member wedge against the pin and the tapered internal surface of the sleeve to perform the locking function. The principal disadvantage of such fasteners lies in the cost factor. The operating member with its ball bearings must be precision machined if it is to cooperate properly with the outer sleeve. Moreover, difficulties in assembly of these finely machined parts add to the cost of the item.

We have discovered that these and other disadvantages may be overcome by the elimination of the tubular hollow-ended operating member and its ball bearings and the provision in its stead of a cheap and simple-to-assemble wire and protruding lug, lock washer. Such a construction likewise eliminates the need for the tapered internal surface of the sleeve. Our invention offers an inexpensive ring fastener assembly having a most adequate locking function.

Other and more specific objects, features, and advantages of the invention will appear from the detailed decription given below, taken in connection with the accompanying drawings which form a part of this specification and illustrate by way of example the presently preferred embodiment of the invention.

In the drawings—

Fig. 1 is a fragmentary side elevational view of a loose leaf binder with the ring fastener assembly locked in place;

Fig. 2 is an enlarged vertical sectional view of the ring fastener assembly locked in place in the binder;

Fig. 3 is an enlarged partial vertical sectional view showing the fastener in its unlocked position being removed from the binder; and Fig. 4 is a perspective showing of the operating member with its protruding lug washer.

Referring now in more detail to the drawings, Fig. 1 illustrates a binder having a cover 1. This cover is provided with two upstanding rigid flanges 2 and 3, spaced apart so as to form a narrow compartment adapted to receive a downwardly extending rigid flange 4 of an angular sheet 5. A plurality of pins 6 carrying flanges 7 are secured in upstanding fashion to cover 1 closely adjacent to the flange 3, by inserting their lower ends through holes 8 provided in the cover and then spreading said ends in the manner shown at 9. Sheets of loose leaf paper 10 havings holes 11 are dropped over pins 6. The angular sheet 5 extends for approximately the length of the cover 1 and is provided midway of its length with a hole 12 designed to receive a ring fastener assembly 13.

The ring fastener assembly 13, shown more clearly in Fig. 2, is carried on a narrow plate-like member 5a and comprises an exterior sleeve 14 which is provided with an internal cylindrical bore 15 and is externally threaded at its lower extremity as shown at 16. A complementary sleeve 17 internally threaded at its upper extremity 18, is secured to sleeve 14 by threading. The complementary sleeve 17 has an internal cylindrical bore 19, larger in diameter than the bore of sleeve 14. At the lower extremity of the complementary sleeve its internal diameter is substantially reduced so as to form an internal shoulder 20 and aperture 21 adapted to receive one of the upstanding pins 6. An operating member 22 is slidably disposed within the internal bores of both sleeves. This operating member consists of a strand of wire 23 secured at one end to a ring 26 and at its other end to a lock washer 24, having a lug 25 protruding downwardly from the lower surface of the washer at right angles thereto. The wire 23 is attached to the lock washer at a point approximately diametrically opposite the protruding lug 25. The external diameter of lock washer 24 is smaller than the diameter of internal bore 19, so as to permit the washer to slide within the complementary sleeve 17, and its internal diameter is designed so as to permit passage therethrough of one of the upstanding pins 6. A spring 27 is disposed within complementary sleeve 17, with its upper end bearing against an internal shoulder 28 formed on sleeve 14, and its lower end bearing against the top surface of lock washer 24. Under the normal action of this spring 27 the lock washer 24 is urged downwardly within the complementary sleeve 17 until its protruding lug 25 engages the shoulder 20, whereby the washer is canted or tilted as shown in Fig. 2.

The locking function of this device is readily understood by reference to Figs. 2 and 3. When it is desired to position the fastener assembly so as to encompass an upstanding pine 6, the ring 26 is pulled upwardly, thereby compressing spring 26 and centering the washer 24 within internal bore 19 of the complementary sleeve. The pin 6, as shown in Fig. 3 is then free to slide through aperture 21 of the complementary sleeve and the central opening of the lock washer. To lock the fastener relative to the pin, one merely releases the pull on ring 26, thereby permitting the washer to be canted or tilted under the action of spring 27, so as to grip circumferentially the pin 6 as shown at 29 and 30 in Fig. 2. When it is desired to remove the fastener assembly, once again a pull is exerted on ring 26, thereby freeing the washer from locking contact with pin 6.

We claim:

1. In a loose leaf binder construction having a cover part carrying a plurality of upright pins, said pins being adapted to pass through holes in loose leaf sheets, a narrow plate-like member, oppositely disposed to the pins, and an angular sheet adjacently underlying said plate-like member and having a hole midway of its length, the combination with said cover part of a fastener assembly comprising a sleeve rigidly secured to said plate-like member and having an internal shoulder, a complementary sleeve attached to the lower extremity of said first sleeve, both said sleeves being adapted to pass through the hole in the angular sheet and pass over one of the upstanding pins, said complementary sleeve having an internal shoulder at its lower extremity, a protruding lug lock washer slidably disposed in the complementary sleeve and surrounding said upstanding pin, said washer having a lug projecting downwardly substantially at right angles therefrom, a spring located between and bearing against the internal shoulder of the first sleeve and the upper surface of the lock washer so as normally to urge the lock washer downward until said lug contacts the internal shoulder of the complementary sleeve thereby tilting the washer into gripping relation with the upstanding pin, and a wire operating member freely extending through the sleeve and complementary sleeve and attached to the lock washer at a point approximately opposite its lug, whereby the lock washer may be lifted against the action of the spring thus centering it in the complementary sleeve so as to free the washer from contact with the upstanding pin.

2. A fastener comprising a sleeve having an internal shoulder at its lower extremity, a complementary sleeve attached to the lower extremity of said first sleeve and having an internal shoulder, a lock washer having a lug extending at right angles to its lower surface, said washer being slidably disposed in said complementary sleeve above the internal shoulder thereof, a spring located between and bearing against the shoulder of the first sleeve and the upper surface of the washer so as normally to urge the lug of the washer downwardly against the internal shoulder of the complementary sleeve whereby the washer is tilted, and a wire operating member freely extending through the sleeve and complementary sleeve and attached at one end to the lock washer at a point approximately diametrically opposite its lug and at its other end to a pull ring whereby the lock washer can be lifted against the action of the spring.

References Cited in the file of this patent

UNITED STATES PATENTS

| | | |
|---|---|---|
| 600,864 | Glover | Mar. 22, 1898 |
| 1,121,767 | Shields | Dec. 22, 1914 |
| 2,284,018 | Pitt | May 26, 1942 |
| 2,308,363 | Guinane | Jan. 12, 1943 |
| 2,327,873 | Dawson | Aug. 24, 1943 |
| 2,340,129 | Lazaroff | Jan. 25, 1944 |